United States Patent [19]
Bryand

[11] 3,906,616
[45] Sept. 23, 1975

[54] METHOD FOR FABRICATING HONEYCOMB ROLLS

[75] Inventor: Edward T. Bryand, Saco, Maine

[73] Assignee: Metal-Tech, Inc., Biddeford, Maine

[22] Filed: Jan. 17, 1974

[21] Appl. No.: 434,015

[52] U.S. Cl............... 29/121 A; 228/170; 228/171; 228/181; 228/245
[51] Int. Cl.² .......................................... B23K 31/02
[58] Field of Search ....... 29/475, 471.1, 493, 470.5, 29/472.1, 148.4, 121 A, 125, 489; 162/371, 372

[56] References Cited
UNITED STATES PATENTS

| | | | |
|---|---|---|---|
| 3,100,928 | 8/1963 | Bryand | 162/372 |
| 3,259,961 | 7/1966 | Bryand | 162/372 |
| 3,453,712 | 7/1969 | MacKendrick | 162/371 |
| 3,608,167 | 9/1971 | Safran | 29/472.1 |
| 3,832,760 | 9/1974 | Scott | 29/471.1 |

Primary Examiner—Al Lawrence Smith
Assistant Examiner—Robert C. Watson
Attorney, Agent, or Firm—Pearson & Pearson

[57] ABSTRACT

An improved method for fabricating honeycomb cylindrical rolls of the type wherein the honeycomb cylindrical structure is made of thin corrugated strips of metal. Adjacent strips are bonded together at intervals and groups of adjacent strips are swaged together at both ends forming integral, composite end pieces which are then positioned into slots in circular end members of each cylindrical roll. The improved method of fabrication includes encircling the swaged and positioned end pieces with a strip of brazing material and then uniformly heating each of the end members, while slowly rotating the roll on its longitudinal axis causing the brazing material to melt and flow freely, by capillary attraction into each slot, thereby brazing the swaged end pieces to the circular end member.

9 Claims, 6 Drawing Figures

US Patent Sept. 23, 1975 3,906,616
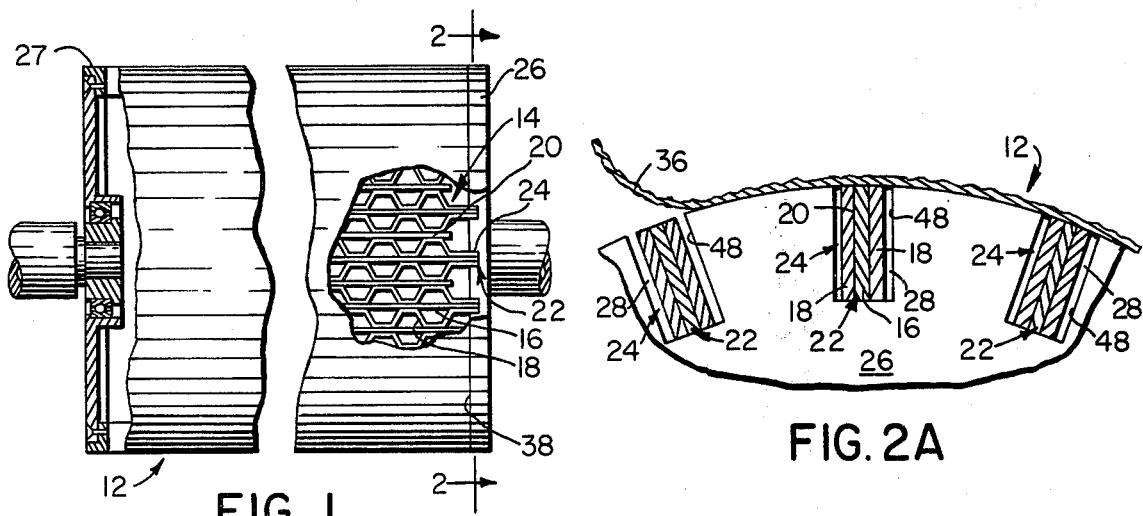
FIG. 1
FIG. 2A
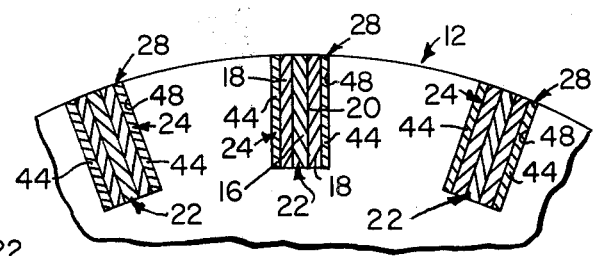
FIG. 2B
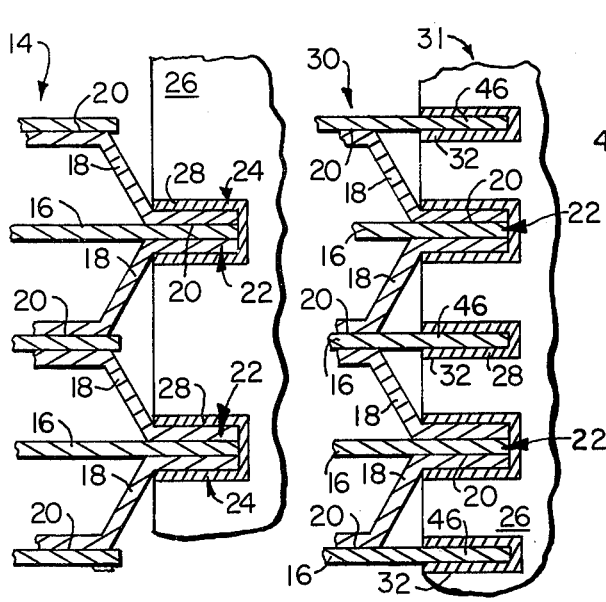
FIG. 3　　FIG. 4
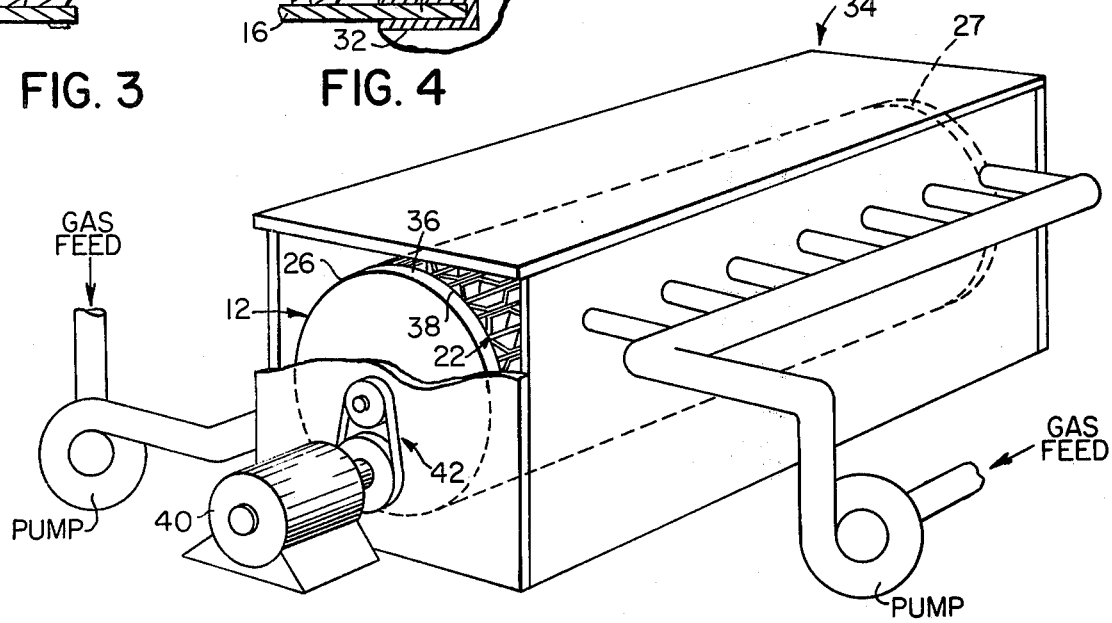
FIG. 5

1

METHOD FOR FABRICATING HONEYCOMB ROLLS

BACKGROUND OF THE INVENTION

Cylindrical honeycomb rolls are known to the art and have gained wide acceptance in a large number of heavy duty applications where high structural strength is required, while maximizing flow of fluid through the structure. One use for such rolls is in making cylindrical suction rolls and other types of filter support media. In one type of honeycomb roll, to which this improvement applies, the roll is a unitary hollow cylindrical honeycomb open work formed of alternate straight and undulating thin strips of metal extending axially from one end support to the other. The circular end supports of the rolls have radial slots to receive and support the terminal end pieces of the axially extending strips. A more detailed description of this form of roll construction may be found in my U.S. Pat. No. 3,139,375 showing the bonded end pieces and radial slots, and in my U.S. Pat. No. 3,590,453 showing the three-part bonded end pieces.

The fabricating procedure used in the prior art to attach the terminal ends of the strips in the slots of the circular end members was to individually and successively braze each strip end piece set into its receiving slot. This procedure was very time consuming in terms of the man hours required to braze each joint separately. In addition, the heating of each joint was not uniformly controlled and consequently there was no assurance that the brazing of each joint was uniform; indeed because of different techniques used by different workmen and the fatiguing nature of the repetitive work, quality of the brazed work varied substantially.

The tolerances of the bonded end pieces were not closely controlled in the prior art. For example, metal strips of 0.050 inches stock, manufactured to mill tolerance, could vary by ±0.005 inches in thickness. Therefore, an end piece of three such strips could vary by 0.030 inches. The 0.030 inches variation in end piece thickness requires that each joint between the end rolls and end pieces receive a varying amount of brazing material and be heated separately. In addition, in order to be sure that the brazing material did not flow out of the joint after brazing, it was necessary to be sure that the joint had cooled off before the slot was moved from an upright vertical position.

Thus, it was desirable to provide an improved process for obtaining high quality and uniform brazed connections between the strips which form the honeycombed open work and the circular end members which support the open work.

SUMMARY OF THE INVENTION

An object of the invention is to provide a method for more controllably brazing a cylindrical honeycomb structure to two supporting circular end members by applying heat uniformly and evenly to each of the end members.

Another object of this invention is to produce a honeycomb roll with a structure relatively free of undesirable thermal stresses induced by brazing each joint separately.

Other objects of this invention will be obvious to those skilled in the art on their reading this application.

The foregoing objects have been substantially accomplished by a process including the steps of forming a honeycomb cylindrical structure of corrugated metal strips wherein adjacent strips are welded or otherwise attached to each other and the terminal ends of a plurality of adjacent strips are swaged together to form integral, composite end pieces. The thickness of the end pieces are controlled to close tolerances and placed into radial slots in two supporting end members. A strip of brazing material is then placed around the circumference of the rolls at the joints between the honeycomb structure and the end members. Each of the end members is heated uniformly, thereby melting the brazing material which is free flowing when melted. The roll may be rotated in an oven to insure that each of the end members is evenly heated. The close tolerance of the end pieces and slots causes the molten material to be held within the slot by capillary attraction.

ILLUSTRATIVE EMBODIMENT OF THE INVENTION

In this application and the accompanying drawings, there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof, and will be able to modify it in a variety of forms, each as may be best suited in the condition of a particular case.

IN THE DRAWINGS

FIG. 1 is a cut-away perspective view of the honeycomb roll.

FIG. 2A is a cross-sectional detailed view of the end members with the brazing strip applied.

FIG. 2B is a cross-sectional detailed view of the end members after the brazing material has been melted.

FIG. 3 is a detailed view of one arrangement of the end members and honeycomb strips.

FIG. 4 is a detailed view of another arrangement of the end members and honeycomb strips.

FIG. 5 is a cut-away schematic view of the brazing operation.

FIG. 1 shows generally a typical construction for a honeycomb cylindrical roll 12 of the type which could be made by this improved process. Metal strips 14 are shown as being either straight, as at 16, or corrugated, as at 18, and lying axially along the length of roll 12. Adjacent strips are bonded together at intervals, as at 20, and the ends of sets of adjacent strips are bonded together to form end pieces 22. The end pieces fit into radial slots 24 which are located around the periphery of circular end members 26 and 27. After roll 12 has been assembled, as shown in FIG. 1, a strip of brazing material 36 (shown in FIG. 2A) is applied to the periphery of end members 26 and 27 to encircle the same. Also shown in FIG. 2A are end pieces 22 in radial slots 24.

For further clarity, FIG. 3 shows a detailed view of the strips 14, end pieces 22, and slots 24 into which the end pieces 22 fit. In this embodiment, the end pieces 22 are swaged to a tolerance of ± 0.002 inches and the slots 24 are a minimum of 0.002 inches larger than the largest thickness of the end pieces 22. As a result, for a minimum end piece thickness, the slot will allow at least 0.004 inches clearance. For maximum strength, the gap 28 to be filled by brazing material should be between 0.000 inches and 0.010 inches. It can be seen that the limit achieved by this embodiment is within that optimum range. The close clearance maintained between the slots 24 and the swaged end pieces 22 is important for reasons which will be described hereafter.

FIG. 4 is a detailed view similar to FIG. 3 except that it shows a slightly different embodiment for a honeycomb structure 30 which results in additional end pieces 46 and slots 32 in end members 31.

FIG. 5 shows the entire honeycomb roll 12 placed in oven 34. However, any suitable means for uniformly heating the end members 26 and 27 may be used. A strip of brazing material 36 is shown completely encircling end members 26 and 27 at the joints, as at 38, between the end pieces 22 and the end members 26 and 27. The end members 26 and 27 and strips of brazing material 36 are heated to a temperature at which the brazing material 36 melts and may flow freely. In one embodiment of this process the brazing material employs a silver or nickel base alloy which flows readily at 1,600° to 2,200°F.

The heated roll 12 is slowly rotated by motor 40 and drive assembly 42 to insure that each end member 26 and 27 is heated uniformly. As shown in FIG. 2B the free flowing brazing material 44 of strips 36 is drawn by capillary action into the gap 28 between the swaged end pieces 22 and the walls 48 of the slots 24. The gaps 28 between the slots 24 and swaged end pieces 22 must be sufficiently small to maintain capillary attraction between the slots 24 and the molten brazing material 44 to prevent the material from flowing out of slots 24 regardless of the attitudes of the slots.

It is also understood that the following claims are intended to cover all of the generic and specific features of the invention herein described and all statements of the scope of the invention which might be said to fall therebetween.

I claim:

1. In a method for making honeycomb rolls of the type formed of a pair of circular end members, each having radial slots of uniform dimensions spaced around the inner periphery thereof, and a honeycomb mesh open work made from alternate strips of straight and corrugated thin metal, adjacent strips being bonded together to form integral end pieces fitting into the slots in the end members, the improvement comprising the steps of:
bonding the end pieces by swaging them to closely controlled tolerances and inserting them into said slots to form a honeycomb roll with an axis of rotation,
encircling each end member with a strip of brazing alloy, the strip being in close proximity to the slots in which the end pieces are inserted;
slowly rotating said roll on said axis while applying heat evenly to each end member, thereby melting the strip of brazing alloy and causing it to be free flowing;
flowing the free-flowing brazing material into the slots in the end members, thereby brazing the end members to the end pieces when the brazing material has solidified.

2. A method as defined in claim 1, wherein: the end members are heated to from 1,600° to 2200°F.

3. A method as described in claim 1, wherein: the end members are evenly heated by rotating the roller in an oven.

4. A honeycomb cylindrical roll manufactured by the process defined in claim 1.

5. A method as defined in claim 1, wherein: the step of flowing the free-flowing brazing material into the slots comprises forming a narrow gap of predetermined close tolerance between the end pieces and slots to thereby cause the brazing material to flow by capillary attraction.

6. A method for making honeycomb cylindrical rolls which comprises the steps of:
forming a pair of circular roll ends each having radially extending slots of uniform predetermined dimensions spaced around the inner periphery thereof;
assembling a honeycomb mesh open work of straight and corrugated strips of thin metal in a half hexagonal pattern and with one straight end and two corrugated ends of said strips juxtaposed into a single three-piece member all around each opposite side edge of said open work, said strips being bonded to each other;
mechanically swaging the said three-piece members into integral composite end units of predetermined dimensions;
then inserting said swaged integral end units into said slots in said end members and establishing clearance gaps therein of predetermined tolerance to form a honeycomb mesh cylinder;
then encircling the said end units, while seated in said slots, with a band of brazing alloy extending circumferentially around said clearance gaps at each end of said roll;
then rotating said roll and applying high temperature to said alloy band while wrapped around said roll ends to cause it to flow freely and fill said clearance gaps between the inner walls of said slots and the outer faces of said swaged ends by capillary attraction to braze the same uniformly.

7. A method as specified in claim 6, wherein: said step of applying high temperature to said alloy bands encircling each opposite end of said roll includes the step of heating said roll in a box furnace which is uniformly heated and the step of rotating said roll slowly during said heating step.

8. A method as specified in claim 7, wherein: said box furnace is heated at a temperature of 1,600° to 2,200°F and wherein the free flowing temperature of said brazing alloy is 1,600° to 2,200°F.

9. The method of attaching a slotted solid end ring to a honeycomb open work cylinder which comprises the steps of:
mechanically swaging the projecting, terminal, juxtaposed ends of the strips forming said cylinder to a thickness tolerance of ± 0.002 inches;
milling said slots to a uniform predetermined width 0.002 inches greater than the largest thickness of said swaged ends to provide each slot with 0.004 inches clearance;
positioning said swaged juxtaposed strip ends each in one of said milled slots to form a cylindrical roll having a central longitudinal axis of rotation, the clearance gaps between each said end and its slot being of predetermined tolerance for capillary action;

then wrapping a band of high temperature brazing alloy around each opposite end ring of said roll to cover said clearance gaps;

then rotating said cylindrical roll on its central longitudinal axis of rotation and simultaneously uniformly heating and melting said alloy into free flowing condition to flow from outside said gaps into said gaps by capillary attraction to fill the same.

* * * * *